Feb. 6, 1962
H. M. HERMANSON
3,019,651
LIQUID QUANTITY MEASURING APPARATUS
Filed Nov. 30, 1956
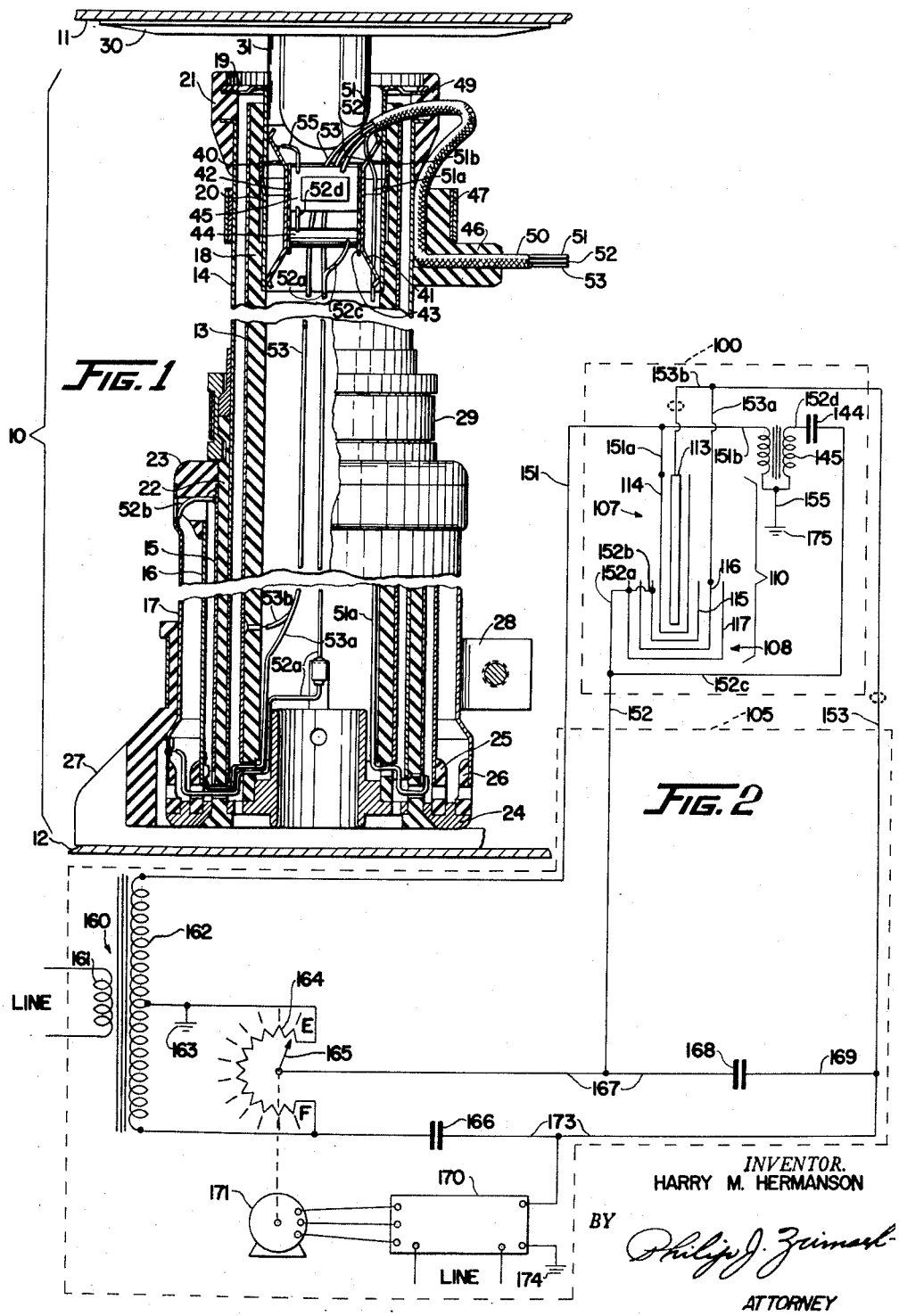
INVENTOR.
HARRY M. HERMANSON
BY
Philip J. Zimmerl
ATTORNEY

United States Patent Office 3,019,651
Patented Feb. 6, 1962

3,019,651
LIQUID QUANTITY MEASURING APPARATUS
Harry M. Hermanson, Golden Valley, Minn., assignor to Minneapolis-Honeywell Regulator Company, Minneapolis, Minn., a corporation of Delaware
Filed Nov. 30, 1956, Ser. No. 625,382
9 Claims. (Cl. 73—304)

The present invention is directed to a dielectric liquid level or quantity measuring system of the capacitive type, which includes a liquid level measuring device and a dielectric compensating device, wherein the indicator needle or pointer of a liquid quantity indicator utilized for indicating the level or quantity of liquid in the container being measured is driven to one of its end positions upon a rupture or open connection in one of the electrical conductors disposed between and connecting the liquid level measuring device and the dielectric compensating device with the remainder of the system.

As indicated above, the present invention is utilized with a capacitive liquid level measuring system and can be of the type shown in the Robert D. Meyers Patent 2,754,457. Therein, a tank unit, which is comprised of a liquid level measuring device and a dielectric compensating device, is located within the container wherein the liquid being measured is located, while the remainder of the liquid level measuring system is remotely located from said container. As shown in the aforementioned Meyers patent, three electrical conductors extend between the tank unit and the remainder of the system. A rupture of a specific one of the three aforementioned electrical conductors results in a faulty indication to be presented on the associated liquid quantity indicator. The present invention is directed to an arrangement for remedying this faulty indication by causing the liquid quantity indicator to indicate an "empty" condition of the particular container wherein the liquid being measured is located upon an open connection occurring in the specific one of the three electrical conductors.

The problem, which the present invention solves, made itself apparent after a recent aircraft mishap which took place on takeoff, when it was discovered that the aircraft, prior to the mishap, was not loaded with fuel as planned and as indicated by the fuel gage measuring system. Upon reconstruction of the mishap, it was discovered that one of the fuel tanks had a significantly less amount of fuel than was indicated, and this resulted in the center of gravity of the aircraft to be displaced so as to be out of the safe operating range of the aircraft. As the aircraft became airborne, the displacement of the center of gravity from the safe operating range became apparent but the aircraft crew, due to the speed of the aircraft, height of the aircraft, etc., was unable to rectify the error prior to the mishap. After intensive investigation, it was discovered that the ground crew had failed to connect one of the three electrical conductors which lead from the tank unit to the remainder of the fuel gage system for the particular fuel tank under consideration. As will be later explained, the particular electrical connector which was not properly connected resulted in the indication provided by the fuel gage measuring system to be in substantial error. The error was to the high side, that is, the indication provided indicated much more fuel was contained in that particular fuel tank than there actually was. As the ground crew fueled the aircraft in accordance with the indication provided by the fuel measuring system, they supplied fuel to the particular fuel tank under consideration only until a "full" indication was displayed by its fuel gage measuring system. Thus, it can be seen that the center of gravity of the aircraft was displaced from the area at which it would be under an actual full condition of that particular tank. In fact, the center of gravity of the aircraft was displaced to such an extent as to be outside of the safe operating range of the aircraft and the aforementioned mishap resulted.

Of course, the electrical conductors, between the tank unit and the remainder of the measuring system could be ruptured by battle damage, improper handling of the measuring system, etc., and hence the problem of an incorrect indication of the amount of fuel in the tank could arise in other situations other than that where the ground crew failed to make the proper connections between tank unit and the remainder of the system.

The solution of the problem of an incorrect indication due to a particular one of the conductors between the tank unit and the remainder of the system being ruptured was imperative, as such an open connection could arise under the various conditions mentioned above. The present invention was conceived to eliminate the erroneous indication caused by the open connection between the tank unit and the remainder of the system by physically locating an impedance means within the fuel tank proximate to the tank unit and by placing said impedance means in the system in such a manner that it normally has no effect upon the accuracy of the indication presented by the fuel gage measuring system, but upon an open connection in the electrical conductor between the tank unit and the remainder of the system, a continuous error signal is set up which causes the indicator needle or pointer to be driven to one of its end positions. The circuitry involved in incorporating the impedance means into the remainder of the fuel gage measuring system coupled with the proximate location of the impedance means with respect to the tank unit requires no extra electrical conductors to be utilized in connecting the tank unit and the impedance means to the remainder of the system, thereby giving rise to no problem which such an extra electrical conductor would present.

It should be pointed out that this innovation does not result in an accurate reading of the quantity of fuel in the particular fuel tank when the open connection problem arises, however, it does indicate to the ground crew or air crew, depending upon the situation, that the fuel tank involved is "empty." To the air crew, when the aircraft is in flight, the displaced aircraft center of gravity, which will result due to the "empty" condition of one of the fuel tanks as compared to the calculated aircraft center of gravity utilizing the "empty" condition of the said one of the fuel tanks, will make itself felt by setting up abnormal loads on the control surfaces of the aircraft, however, sufficient time should remain for the air crew to make the sufficient transfer of fuel from one tank to another to alleviate the undesirable condition that is, abnormal loads on the control surfaces of the aircraft. It is obvious that this type of undesirable condition cannot be corrected in the short time it takes for the aircraft to begin its take-off until it is airborne. It is at this critical point, that the aircraft center of gravity must be within the safe operating range. Thus, it is imperative for the air crew or the ground crew to know prior to take-off what the condition of the fuel in each of the fuel tanks is. Thus, if one of the fuel tanks shows "empty," the ground crew supposedly would fill that tank, however, that tank, under the conditions presumed, would still indicate "empty," and would thus indicate to the crew that a malfunction is present and further investigation must be pursued.

While the present invention has been discussed with respect to the results that can occur when the center of gravity of the aircraft is out of the safe operating range without such knowledge being available to the crew, it is apparent that the present invention is equally valuable in an installation such as a fighter aircraft, where a single indicator is utilized to indicate the total quantity of fuel remaining aboard the aircraft. Upon a rupture in a specific one of three conductors disposed between and connecting the tank unit with the remainder of the liquid quantity measuring system wherein the present invention is utilized, the indicator would indicate "empty," thereby forcing the pilot of the aircraft to seek the nearest landing area. Without the utilization of the present invention, a rupture in the specific one of the three conductors disposed between and connecting the tank unit with the remainder of the liquid quantity measuring system would result in the indicator indicating much more fuel available than was actually the case, with the possible result of the aircraft running out of fuel while in mid-air and a considerable distance from a safe landing area.

It is an object of this invention to cause the needle or pointer of a liquid quantity indicator to move to an extreme position, regardless of which electrical conductor between the tank unit and the remainder of a liquid quantity measuring system is ruptured.

It is a further object of this invention to provide an impedance means associated with a tank unit and so electrically connected in a liquid quantity measuring system so that upon a rupture in one of the electrical conductors between the tank unit and the remainder of the system, an error electrical signal is introduced into the system to cause the needle or pointer of an indicator to be driven to one of its end positions.

These and other objects will become apparent from a reading of the following specification and appended claims in conjunction with the drawings wherein:

FIGURE 1 is a sectional view of a tank unit incorporating the means for utilizing the invention and showing the physical relationship of said means to the tank unit.

FIGURE 2 is a simplified electrical schematic showing of a liquid quantity measuring system incorporating the invention.

In FIGURE 1, an impedance probe in the form of a tank unit 10, of a type shown in the Robert D. Meyers Patent 2,754,457, is shown disposed within a container having an upper wall 11 and a lower wall 12. The tank unit 10 has a measuring portion and a dielectric compensating portion. The measuring portion, which takes the form of an open capacitor, is comprised of an inner cylindrical electrode 13 and an outer cylindrical electrode 14. The dielectric compensating portion of the tank unit which takes the form of an open capacitor is comprised of an inner cylindrical compensator electrode 15, a middle cylindrical compensator electrode 16 and an outer cylindrical compensator electrode 17.

An insulator cylinder 18 has a flange 19 operatively fastened to the upper extremity thereof and has a ring 20 located within the inner periphery of the insulator 18. A molded insulator 21 cooperates with the flange 19 and the outer electrode 14 to accurately position and locate the inner electrode 13 with respect to the outer electrode 14 at their upper extremities. Insulating cylinder 22 is provided between the outer electrode 14 and the inner compensator electrode 15 so as to afford no electrical connections between the aforementioned electrodes. Molded insulator 23 is operatively fastened to the insulating cylinder 22 so as to provide a means to which the middle compensator electrode 16 and the outer compensator electrode 17 can be operatively fastened so as to accurately locate and position the upper portions of the three electrodes 15, 16, and 17 of the compensator portion of the tank unit 10 with respect to each other. At the bottom extremity of the tank unit 10, a cylindrical member 24 is provided with appropriate apertures to receive the lower most portions of the insulating cylinder 18, the insulating cylinder 22, and a pair of molded insulators 25 and 26, utilized to locate the lower portions of the middle and outer compensator electrodes 16 and 17 with respect to each other, and the lower portion of the inner compensator electrode 15. Still another molded insulator 27 is located at the bottom extremity of the tank unit 10 and is suitably attached thereto. The molded insulator 27 rests upon the lower wall 12 of the tank to provide a base for the tank unit 10.

It will be noted that apertures are provided in the cylinder member 24 and the molded insulators 25 and 26 to allow the liquid which forms the dielectric of the measuring and dielectric compensating capacitors, to pass between the electrodes of the measuring portion of the tank unit and the compensator portion of the tank unit.

The tank unit 10 is mounted and located within the tank by means of mounting straps 28 and 29, which are suitably attached to appropriate portions of the tank unit 10 which straps have provisions for fastening to a spar or upright located within the tank, and by locating a mounting base 30, which is operatively connected to the upper wall 11 of the tank, so that protrusion 31 is partially located within the inner periphery of the flange 19.

Also located within the inner periphery of the flange 19 and the inner periphery of the ring 20 is an arrangement comprised of springs 40 and 41 separated by and connected to insulating spacers 42 and 43, and impedance means in the form of a capacitor 44, and a phase shift means in the form of a phase shift transformer 45. The aforementioned arrangement is a unitary structure and is so constructed that it can be easily inserted into or removed from its normal position within the tank unit 10. Further, it will be noted that when in the position shown in FIGURE 1, the aforementioned arrangement is not susceptible to extremes of fuel sloshing, handling by maintenance personnel, etc.

A molded insulator 46 is held in place by a hose type clamp 47 which is fastened about the outer electrode 14 and the molded insulator 46, making a prisoner of the last mentioned element. Both molded insulator 46 and molded insulator 21 have appropriate openings for passing an electrical cable 50 therethrough. Further, appropriate openings are provided in the outer electrode 14, insulating cylinder 18, and flange 19 for passing electrical cable 50 therethrough.

The cable 50 is comprised of three electrical conductors 51, 52, and 53. For sake of simplicity, the conductors will be referred to with suffix letters, so that each of the three conductors will be followed within the tank unit 10 with the same digital number but with different letter after each connection. Common conductors between two of the conductors, which common conductor is located within the tank unit 10 will be identified by a different numeral. As shown, conductor 51, after passing through the inner most extremity of the covering surrounding the cable 50, branches and has one portion 51a which passes down through the interior of the tank unit 10, through the apertures provided in the insulator cylinder 18, insulator cylinder 22, and is operatively attached to the outer electrode 14 near its lower extremity. The other branch 51b is operatively connected to the phase shift means 45. Conductor 52 has a first branch 52a which passes down through the interior of the tank unit 10 towards the bottom extremity thereof, through the apertures provided in the insulator cylinder 18, the insulator cylinder 22, and the molded insulator 25 and is attached to the outer compensator electrode 17. Branch 52b is disposed between and connects the upper portions of the inner compensator electrode 15 and the outer compensator electrode 17. Near the upper extremity of the tank unit 10, branch 52c of conductor 52 is connected to the impedance means 44. From the other end of the impedance means 44 branch 52d is disposed between and connects the impedance means 44 and the phase shift means 45. The inner electrode 13 is connected by branch 53b of the conductor 53 while a second branch 53a of the conductor 53 is electrically connected near the lower extremity of the tank unit to the middle compensator electrode 16. A conductor 55 connects a portion of the phase shift means 45 to ground or reference potential by connecting it to the spring member 40, which in turn has an operative connection to the flange 19, the protrusion 31, the mounting base 30, and the upper tank 11 which is connected to ground or reference potential.

With the construction described, the tank unit of FIGURE 1 includes a measuring portion, a compensating portion, and further means, the exact function of which will be further explained in conjunction with FIGURE 2. Further, the arrangement is so constructed that the number of conductors leading from the tank unit to the remainder of the system is not increased over prior art arrangements.

The patentable improvement and its mode of operation will be more fully described in conjunction with FIGURE 2 in which the tank unit and associated elements described in FIGURE 1 are contained within a first box 100. For sake of explanation, the box 100 can be considered as an aircraft fuel tank. The remainder of the structure shown in FIGURE 2 is contained within a second box 105. The box 105 can be considered as a case for and the elements contained therein can be considered as the components of a combination amplifier-motor-indicator of the type shown in the copending application of John E. Anderson, Serial No. 511,040, filed May 25, 1955, which is assigned to the instant assignee and now abandoned.

The arrangement of FIGURE 2 is a simplified showing of a capacitive liquid quantity measuring arrangement of the null-balance type which is well known in the art and is essentially that shown in the forementioned Meyers patent. Essentially, the arrangement comprises an alternating current bridge wherein one branch is comprised of a tapped secondary of a transformer and the other branch includes a first leg having a level measuring device therein and a second leg having a dielectric compensating device. In the detecting leg of the bridge, which is connected between the tap of the secondary and the junction between the first and second legs of the second branch, a detector or rebalance means is located which responds to the unbalance of the bridge and causes a variance in the effective voltage output from one of the legs of the secondary to thereby bring about balance in said bridge. The extent to which the effective voltage output from the said one of the legs of the secondary is varied provides a measure of the quantity of liquid within the container being measured.

In FIGURE 2, a transformer 160 has a primary winding 161 which is connected to a source of power, not shown, and a tapped secondary winding 162. The tap of the secondary 162 is placed at ground or reference potential 163. Across the lower portion of the secondary 162 a resistive winding 164 is located which cooperates with a wiper 165 to vary the effective output potential of the lower portion of the secondary through the wiper 165. To an upper portion of the secondary 162, an electrical conductor 151 is connected which passes out of the amplifier-motor-indicator case 105 and into the fuel tank 100 to be connected, by means of branch 151a of the conductor 151, to outer electrode 114 of a measuring portion 107 of tank unit 110. A conductor 167 connects the wiper 165 to a first portion of reference capacitor 168. Electrical conductor 152 passes from a junction with conductor 167 out of the amplifier-motor-indicator case 105 and into the fuel tank 100 where branches 152a and 152c are formed. Branch 152a leads to outer compensator electrode 117 of a dielectric compensating device 108. Branch 152b is disposed between and connects the outer compensator electrode 117 and inner compensator electrode 115. Branch 152c leads to and is connected to a first portion of impedance means 144. Branch 152d is disposed between and connects a second portion of impedance means 144 to one end portion of a phase shift means 145 which means is center tapped to ground or reference potential at 175 by means of conductor 155. Branch 151b is connected to a second end portion of the phase shift means 145. The conductor 153 passes through the amplifier-motor-indicator case 105 and into the fuel tank 100 where it has a first branch 153a which is connected to the middle compensator electrode 116 and a second branch 153b which is connected to inner electrode 113 of the measuring device 107.

The electrical conductors of FIGURE 2 utilized to connect the measuring device 107, the dielectric compensating device 108 of the tank unit 110, the phase shift means 145 and the impedance means 144, are numbered one hundred numbers higher and with the same suffix letters as their counterparts in FIGURE 1.

A capacitor 166, a first portion of which is connected to a lower end terminal of the secondary 162, is provided to give a signal equal to but opposite in phase from the signal derived from the measuring portion 107 of the tank unit 110 due to its air capacitance. The conductors 173 and 169 leading from second portions of capacitors 166 and 168 and conductor 153 meet in a common junction which forms one output terminal of the bridge. The other output terminal of the bridge is formed by the reference or ground potential 163. It will be noted that amplifier 170 is also connected to ground or reference potential at 174, therefore a complete detecting leg has been provided. As the potential of conductors 153, 169, and 173 is the same, one of the output terminals of the bridge is shown to be connected to the input of amplifier 170 along conductor 173.

As intimated above, the electrodes 113 and 114 form the measuring portion 107 of the tank unit 110, while the electrodes 115, 116 and 117 form the dielectric compensating portion 108 of the tank unit 110. The fuel located in the tank and which surrounds the aforementioned electrodes serves as the dielectric material. Thus, the signal derived from the measuring portion 107 is varied according to the voltage applied thereto, to the dielectric constant of the fuel, and the height of the fuel between the electrodes, while the signal derived from the compensating portion is varied according to the voltage applied thereto and the dielectric constant of the fuel only, as the compensating portion is normally totally immersed in the fuel.

Assuming the bridge of FIGURE 2 to be balanced, a variance in the level of the fuel to which the measuring portion 107 is exposed, results in an unbalance signal to be set up in the detecting leg of the bridge causing a signal to be passed to the input of amplifier 170 which provides an appropriate signal to be passed to a phase sensitive reversible motor 171 to drive the wiper 165 in the appropriate direction about the winding 164 tending to bring about rebalance in the system. The repositioning of the wiper 165 causes a change in the voltage applied to the capacitor 168 and the dielectric compensating portion 108 of the tank 110, thereby reducing the difference between the signal provided by the measuring portion 107 of the tank unit 110 and the signals provided by the capacitors 166 and 168 and the dielectric compensating portion 108 of the tank unit 110. Upon the difference in the aforementioned signals approaching zero, the motor 171 is caused to be stopped and further rotation ceased. The position of the wiper 165 along the winding 164 gives an indication of the amount of fuel in the fuel tank 100. As has been mentioned above, this type of arrangement is old in the art and no further discussion will be given here as to the function of the dielectric compensating portion 108 of the tank unit 110, etc.

It will be noted that three electrical conductors 151, 152, and 153 are disposed between the amplifier-motor-indicator case 105 and the fuel tank 100. Under normal conditions, all three conductors are in the condition shown and an operative arrangement results.

The functioning of the invention which is comprised of the inclusion of the phase shift means 145 and the impedance means 144 as shown, as related to an aircraft liquid quantity measuring system, will now be explained. Initially, it should be noted that the inclusion of the impedance means 144 and the phase shift means 145 in the circuit results in no appreciable inaccuracy when the three electrical conductors 151, 152, and 153 are in an operative condition and not subject to an open connection. Thus, under ordinary circumstances, the impedance of the circuit commencing at ground or reference potential 163, and including the upper portion of the secondary 162, the conductor 151, the branch 151b, the phase shift means 145, the branch 152d, the impedance means 144, the branch 152c, the conductor 152, the conductor 167, the wiper 165, and the appropriate portion of the resistive winding 164 and terminating at ground or reference potential 163 is much less than the circuit commencing at ground or reference potential 163 and including the upper portion of the secondary 162, the conductor 151, the branch 151b, the phase shift means 145, the branch 152d, the impedance means 144, the branch 152c, the branch 152a, the dielectric compensating portion 108, the branch 153a, the conductor 153, the conductor 173, the input to the amplifier 170 and terminating at the ground or reference potential 174. Likewise, the impedance of the first described circuit is far less than the impedance of the circuit including the capicitor 168, which capacitor is in parallel with the dielectric compensating portion 108. Thus, the current flow in the first described circuit is much more than the current flow in the latter two described circuits according to the relative impedances of the circuits. It can therefore be seen that the inclusion of the phase shift means 145 and the impedance means 144 will have little relative effect upon the accuracy of the system under circumstances when there is no open connection in the electrical conductors 151, 152, and 153.

Listed below is a table of approximate values for the more pertinent elements of the circuit.

| | |
|---|---|
| Measuring portion 107 in air _____μμf__ | 300 |
| Measuring portion 107 with gasoline as a dielectric _____μμf__ | 600 |
| Dielectric compensator 108 portion immersed in gasoline _____μμf__ | 140 |
| Reference capacitor 168 _____μμf__ | 160 |
| Capacitor 166 _____μμf__ | 300 |
| Capacitor 144 _____μμf__ | 300 |
| Turn ratio of phase shift means 145 _____ | 1:5 |
| Resistive winding 164 _____ohms__ | 1830 |

The foregoing is merely for the purpose of illustration and is not to be construed as the only combination under which the present invention can be utilized.

Should any one of the conductors 151, 152, and 153 be ruptured, resulting in an open connection, an inaccuracy in the indication provided by the wiper 165 along the winding 164 would result. If it should be assumed that the conductor 151 is ruptured, it can be seen that there will be no output signal, dependent upon the level of the fuel within the fuel tank 100 from the measuring portion 107 of the tank unit 110, as an open connection results between the secondary 162 and outer electrode 114. Thus, the signals resulting from the capacitor 166, the capacitor 168, and the compensating portion 108 of the tank unit 110, all being of the same phase and opposite to that usually derived by the measuring portion 107 of the tank unit 110, will be unopposed and of such a phase as to cause the amplifier 170 to drive the motor 171 and the wiper 165 until the wiper 165 approaches its empty position. Thus, a fail safe result occurs as the ground crew or the air crew of the aircraft concerned is told that an "empty" condition exists in one of the fuel tanks. As explained in the introduction of this specification, the appropriate action can be taken.

Likewise, should the conductor 153 be ruptured, a complete circuit would not be set up between ground or reference potential 163 of the secondary 162, through the upper portion of secondary 162, conductors 151, 151a, the measuring portion 107 of the tank unit 110, conductors 153b, 153, and 173, and the reference tap 174 of the amplifier 170. Similarly, should the conductor 153 be ruptured, a complete circuit would not be set up between ground or reference potential 163 of the secondary 162 through the appropriate portion of the resistive winding 164, the wiper 165, conductor 167, conductor 152, branch 152a, the dielectric compensating portion 108, branch 153a, conductor 153, conductor 173, to the input of the amplifier 170 and thence to ground or reference potential 174. Thus, the measuring portion 107 and the dielectric compensating portion 108 would not be included in the circuit to provide the appropriate signals to the amplifier 170, however, a signal would be provided from the capacitors 166 and 168 which would be of a phase opposite to the signal which would normally be provided by the measuring portion 107 of the tank unit 110, and thus, as they are unopposed, would result in the amplifier 170 causing the proper rotation of the motor 171 to position the wiper 165 at an empty position. Here again, the ground crew or air crew of the aircraft concerned would be aware of the "empty" condition.

However, should the conductor 152 be ruptured or severed, and without the provision of the impedance means 144 and 145, the wiper 165 would not be driven to its empty position. Thus, the measuring portion 107 of the tank unit 110 would provide a signal indicative of the height of the level in the container. Further signals would be provided by the capacitors 166 and 168 to oppose the signal derived from the measuring portion 107 of the tank unit. However, the signal normally provided, which is in opposition to the signal provided by the measuring portion 107 of the tank unit 110, from the compensating portion 108 of the tank unit 110 would not appear in the circuit due to the open connection of conductor 152 which is connected to the dielectric compensating portion 108 of a tank unit 110 by means of branch 152a. According to experience in a system utilizing elements having values as set forth in the foregoing table, this results in the indication of approximately three times as much fuel in the fuel tanks than actually exists. Of course, the indicator can never show more than a full condition. Thus, it can be seen that if a tank is only one quarter full and the conductor 152 is ruptured, the indicator for that fuel tank will indicate an approximately three-quarter full condition. Without knowledge of the ruptured conductor the center of gravity may be placed out of the safe operating range of the aircraft. It is apparent what results can follow, especially during takeoff of the aircraft. Further, the instantaneous range of the aircraft may be incorrectly calculated on the basis of the indicated fuel quantity, thereby possibly resulting in the exhaustion of fuel while in mid-air and while at a good distance from a safe landing area.

By including an impedance means such as 144 and a phase shift means such as 145, the rupturing of conductor 152 will result in the indicator displaying an "empty" condition for the particular fuel tank involved. Thus, with the conductor 152 ruptured, a signal is passed from the tap 163 of secondary 162 through the upper portion of secondary 162 the conductors 151, 151b, the phase shift means 145, the impedance means 144, the conductor 152c, the conductor 152a, compensating portion 108, to the conductor 153a, and conductor 153 to the input of amplifier 170. As has been mentioned previously, the impedance means 144 and phase shift means 145 normally have no effect on the system, however, when the conductor 152 is ruptured, a signal is set up in the system which is of such a magnitude and phase that when coupled with the signals arising from the capacitors 166 and 168 it is larger than any signal that can be derived from the measuring portion 107 of the tank unit 110. Therefore, a constant unbalance signal results which is of such a phase as to cause the amplifier 170 to drive the reversible motor 171 in such a direction as to position the wiper 165 at the empty position.

It will be thus seen that when utilizing the present invention with a measuring portion and a dielectric compensating portion of a tank unit liquid quantity measuring system, the three conductors leading and connecting the measuring portion and dielectric compensating portion with the remainder of the system can each be ruptured or otherwise subjected to an open connection without fear that the system will provide an indication other than "empty." While, of course, it is always desirable to know the exact amount of fuel in a tank, it is obvious that upon certain conditions it is better to know that a malfunction exists or the indication given is "fail safe" so that a fault in the system will not result in a faulty indication which would normally be relied upon.

The present invention fulfills a need and solves a problem which occurs when one of the conductors disposed between a measuring portion and dielectric compensating portion of a liquid quantity measuring system and the remainder of the system becomes ruptured so as to cause the indication received from that apparatus to read "empty" and to thereby give a clue that a malfunction has arisen.

The present invention has been described in conjunction with a liquid quantity measuring system, however, as is well known in the art, the invention could be utilized equally as well in a system wherein the substance to be measured is of granular, powdered or semi-liquid form.

As shown, a phase shift means is used in conjunction with an impedance means to provide a signal of the proper phase and magnitude to cause the indicator pointer or needle to be driven to an "empty" position upon one of the conductors disposed between the tank unit and the remainder of the system being ruptured. It is apparent, that the phase shift means can be dispensed with and the system redesigned by the inclusion only of the proper size impedance means to cause the indicator needle or pointer to be driven to the "full position" and thereby engage a contact and energize an alarm.

Therefore, while a single preferred embodiment has been shown, the present invention should be determined from the following claims in which I claim:

1. In a dielectric material quantity measuring null balance bridge network system comprising a first source of voltage having an output terminal and a reference connection and having a first sense, a second source of voltage having an output terminal and a reference connection and having a second sense and being of a variable magnitude, a capacitive quantity measuring means for insertion into a container having one portion thereof connected to the output terminal of said first source of voltage, a capacitive dielectric compensator means for insertion into the container having one portion thereof connected to the output terminal of said second source of voltage, said measuring means and said compensator means comprising a first and a second leg of a branch of said bridge, rebalance means responsive to the output signal of said bridge and having a reference terminal connected to the reference connections of said first and second sources of voltage and operable to vary the magnitude of said second source of voltage to thereby rebalance said bridge, and impedance means operatively secured to one of said capacitive means, said impedance means having one terminal operatively connected to the connection between said first source of voltage and said measuring means and having a second terminal thereof operatively connected to the connection between said second source of voltage and said compensator, said operative connections being located within the container, said impedance means being operative upon a rupture without the container in the connections between said compensator means and said second voltage source to cause a signal to be introduced into said bridge to cause a continuous unbalance in said bridge.

2. In a quantity measuring null balance bridge network system comprising, an impedance quantity measuring means for insertion into a container and having an input terminal, an impedance compensator means for insertion into the container and having an input terminal, said measuring means and said compensator means comprising a first and a second leg of a branch of said bridge, a voltage source connected to the input terminals of said bridge and having a reference connection, rebalance means responsive to the output signal of said bridge and having a terminal connected to the reference connection of said voltage source and operable to vary the magnitude of the voltage applied to said compensator means to thereby rebalance said bridge and further impedance means, said further impedance means connected across the input terminals of said measuring means and said compensator means, the connections formed thereby located within the container, said impedance means operative upon rupture in the connection between said compensator means and said voltage source to cause a signal to be introduced into said bridge to cause a continuous unbalance in said bridge.

3. In a capacitive type liquid level system, a tank unit portion comprising a measuring capacitor and a compensating capacitor; a first conductor connected to one side of said measuring capacitor and extending outside of said tank unit portion for connection to a first voltage source; a second conductor connected to one side of said compensating capacitor and extending outside of said tank unit portion for connection to a second voltage source; conductor means joining the other sides of said capacitors; a third conductor connected to said conductor means and extending outside of said tank unit portion for connection to a voltage responsive device; and impedance means connected inside said tank unit portion between said first conductor and said second conductor and adapted to coact with said first voltage source and said compensating capacitor to provide a signal on said third conductor when a rupture occurs in said second conductor outside of said tank unit portion.

4. A rebalanceable network including, a first source of voltage, a second source of voltage, and a variable source of voltage, each of said voltage sources having an output terminal and a common terminal; a first, a second, a third and a fourth impedance each having an input terminal and a common output terminal; first conductor means connecting the input terminal of said first impedance with the output terminal of said first voltage source; second conductor means connecting the input terminal of said third impedance with the output terminal of said variable voltage source; third conductor means connecting the input terminal of said fourth impedance with the output terminal of said second voltage source; a fifth impedance connected between the input terminals of said first and second impedances; fourth conductor means connecting the connection between said fifth impedance and the input terminal of said second impedance to the output terminal of said variable voltage source; and voltage responsive means connected to the common output terminal of said impedance means and adapted to vary the magnitude of said variable voltage source.

5. In a rebalanceable network, a first source of voltage having a first and a second terminal; a second source of voltage having a first and a second terminal; a first impedance means having an input connected to the first terminal of said first voltage source and having an output; a second impedance means having an input terminal connected to the first terminal of said second voltage source; first conductor means connecting the second terminal of said first voltage source to the second terminal of said second voltage source; a third impedance means; means connecting said third impedance between the inputs of said first and second impedances; second conductor means connecting the outputs of said first and second impedances; and voltage responsive means having a first terminal connected to said second conductor means and a second terminal connected to said first conductor means; the magnitude of the impedance from the first terminal of said first voltage source through said third impedance means and the first terminal of said second voltage source to said first conductor means being substantially less than the magnitude of the impedance from the first terminal of said first voltage source through said third impedance means, said second impedance means and said voltage responsive means to said first conductor so that said third impedance means produces a non-rebalanceable signal to the first terminal of said voltage responsive device upon rupture of the connection between the input of said second impedance and the first terminal of said second voltage source.

6. In a dielectric liquid level measuring null balance bridge network system for determining the quantity of liquid in a container, the combination comprising a tank unit for insertion into the container and a combination amplifier-motor-indicator the amplifier of which has a first and a second input terminal: said tank unit comprising a concentric multi-tube capacitive measuring probe, a concentric multi-tube capacitive dielectric compensator suitably attached to and insulated from said probe, a first electrode of said measuring probe and a first electrode of said compensator being joined by an electrical conductor, and a combination of a phase shift transformer and a capacitor connected in electrical series relationship suitably disposed and supported within the inner tube of said probe; said combination amplifier-motor-indicator including a secondary of a transformer having a tap connected to the first input terminal of the amplifier and having a potentiometer winding across a first end portion thereof, and a wiper associated therewith, the position of said wiper with respect to said winding being indicative of the quantity of liquid within the container, three electrical conductors each having a portion thereof disposed within the inner tube of said measuring probe, the first of said conductors connecting the second end of said secondary to a second electrode of said measuring probe, the second of said conductors connecting said wiper to a second electrode and said dielectric compensator, and the third of said conductors connecting the second input terminal of the amplifier of said combination amplifier-motor-indicator to the conductor joining said measuring probe and said dielectric compensator so that the amplifier is responsive to a signal existing at the input terminals thereof to thereby cause the motor of said combination amplifier-motor-indicator to reposition said wiper in such a direction as to minimize the signal at the input terminals of the amplifier, said combination of a phase shift transformer and a capacitor having one end portion thereof connected to a portion of said first conductor disposed within said measuring probe and having the second end portion thereof connected to a portion of said second conductor disposed within said measuring probe, said combination of a phase shift transformer and a capacitor arranged to provide a signal in said bridge upon rupture in said second conductor exterior of said tank unit to cause a continuous signal at the input terminals of the amplifier to thereby cause said wiper to be driven to its minimum indication position.

7. In a dielectric liquid level measuring null balance bridge network system for determining the quantity of liquid in a container, the combination comprising a tank unit for insertion into the container and a combination amplifier-motor-indicator the amplifier of which has first and second input terminals: said tank unit comprising a capacitive measuring probe, a capacitive dielectric compensator suitably attached to and insulated from said probe, a first electrode of said measuring probe and a first electrode of said compensator being joined by an electrical conductor, and a combination of a phase shift means and an impedance means connected in electrical series relationship suitably disposed with respect to and supported by said capacitive measuring probe; said combination amplifier-motor-indicator including a secondary of a transformer having a tap connected to the first input terminal of the amplifier and having a potentiometer winding across a first end portion thereof, and a wiper associated therewith, the position of said wiper with respect to said winding being indicative of the quantity of liquid within the container, three electrical conductors, the first of said conductors connecting the second end of said secondary to a second electrode of said measuring probe, the second of said conductors connecting said wiper to a second electrode of said compensator, and the third of said conductors connecting the second input terminal of the amplifier of said combination amplifier-motor-indicator to the conductor joining said measuring probe and said compensator so that the amplifier is responsive to a signal existing at the input terminals thereof to thereby cause the motor of said combination amplifier-motor-indicator to reposition said wiper in such a direction as to minimize the signal at the input terminals of the amplifier, said combination of a phase shift means and an impedance means having one end portion thereof connected to a portion of said first conductor proximate to said measuring probe and having the second end portion thereof connected to a portion of said second conductor proximate to said dielectric compensator, said combination of a phase shift means and an impedance means arranged to cause a continuous signal at the input terminals of the amplifier upon rupture in said second conductor to thereby cause said wiper to be driven to its minimum indication position.

8. Apparatus of the class described comprising, in combination: a first source of voltage of a first phase having a first terminal connected to a point of reference potential and having an output terminal; a first impedance having an input terminal and an output terminal; first conductor means connecting the output terminal of said first voltage source to the input terminal of said first impedance; a second source of voltage of a second phase having a first terminal connected to the point of reference potential and having an output terminal a second impedance having an input terminal and an output terminal; second conductor means connecting the output terminal of said second impedance to the output terminal of said first impedance; phase shifting means connected between the input terminal of said first impedance and the input terminal of said second impedance; third conductor means connecting the input terminal of said second impedance to the output terminal of said second source of voltage; and output impedance means having a first terminal connected to the point of reference potential and a second terminal connected to said second conductor means, said phase shifting means and said second voltage source presenting a lower impedance across said first voltage source than said phase shifting means, said second impedance and said output impedance.

9. A tank unit for use in a container of fluid and with a capacitive type fluid level system comprising in combination: a measuring capacitor having an output terminal and having an input terminal to be connected to a first source of voltage; a compensating capacitor having an output terminal and having an input terminal to be connected to a second source of voltage; conductor means connecting the output terminals of said measuring and compensating capacitors; and phase shifting means connected between the input terminals of said measuring and compensating capacitors within the container.

References Cited in the file of this patent

UNITED STATES PATENTS

| | | |
|---|---|---|
| 2,563,280 | Schafer | Aug. 7, 1951 |
| 2,691,889 | Dion | Oct. 19, 1954 |
| 2,754,457 | Meyers | July 10, 1956 |
| 2,789,435 | Weiss | Apr. 23, 1957 |

OTHER REFERENCES

"Networks, Lines & Fields," John D. Ryder, 2nd ed., published by Prentice-Hall, Inc. (page 145). (Available in Div. 66.)

"Alternating Current Circuits," Russell M. Kerchner and George F. Corcoran, 3rd ed., published by John Wiley & Sons, Inc. 1956 (page 472). (Available in Div. 66.)